United States Patent
Saade et al.

(10) Patent No.: US 9,762,383 B2
(45) Date of Patent: *Sep. 12, 2017

(54) SERIAL TRANSMISSION HAVING A LOW LEVEL EMI

(71) Applicants: STMicroelectronics (Grenoble 2) SAS, Grenoble (FR); STMicroelectronics International N.V., Amsterdam (NL)

(72) Inventors: Julien Saade, Grenoble (FR); Abdelaziz Goulahsen, Coublevie (FR)

(73) Assignees: STMICROELECTRONICS (GRENOBLE 2) SAS, Grenoble (FR); STMICROELECTRONICS INTERNATIONAL N.V., Schiphol (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,368

(22) Filed: May 20, 2016

(65) Prior Publication Data

US 2016/0269173 A1    Sep. 15, 2016

Related U.S. Application Data

(63) Continuation of application No. 14/509,377, filed on Oct. 8, 2014, now Pat. No. 9,391,769.

(30) Foreign Application Priority Data

Oct. 10, 2013   (FR) ........................... 13 59841
Feb. 4, 2014    (FR) ........................... 14 50839

(51) Int. Cl.
H04L 29/06    (2006.01)
H04L 9/00     (2006.01)
H04L 25/03    (2006.01)

(52) U.S. Cl.
CPC ............. *H04L 9/001* (2013.01); *H04L 25/03* (2013.01); *H04L 25/03866* (2013.01); *H04L 2209/34* (2013.01)

(58) Field of Classification Search
CPC .... H04L 9/001; H04L 25/03; H04L 25/03866
(Continued)

(56) References Cited

U.S. PATENT DOCUMENTS 7,515,615 B2 *  4/2009  Peeters ................... H04J 13/00
                                                  370/515
8,588,426 B2 * 11/2013  Xin ......................... H04L 9/002
                                                  380/252

(Continued)

FOREIGN PATENT DOCUMENTS

GB      2 402 026 A    11/2004

OTHER PUBLICATIONS

Jin et al., "A Novel Design Technique for Weakly Constrained Codes," IEEE Global Telecommunications Conference, 2001 (GLOBECOM '01), San Antonio, TX, Nov. 25-29, 2001, pp. 2987-2991, vol. 5.

(Continued)

*Primary Examiner* — Michael S McNally
(74) *Attorney, Agent, or Firm* — Seed IP Law Group LLP

(57) ABSTRACT

A method for transmitting data in series includes producing a scrambled signal by applying a scrambling using a pseudo-random sequence to an incoming serial signal conveying the data and producing an outgoing serial signal. The scrambled signal is monitored to detect occurrences of one or more data patterns. In response to the detection of one or more occurrences, one or more actions are taken to protect data in the output signal.

24 Claims, 2 Drawing Sheets

(58) Field of Classification Search
USPC .......................................................... 380/268
See application file for complete search history.

(56) References Cited

U.S. PATENT DOCUMENTS

2002/0181708 A1* 12/2002 Seo ..................... H04L 9/0662
380/252
2010/0275037 A1 10/2010 Lee et al.

OTHER PUBLICATIONS

Lim et al., "VLC PHY Considerations," IEEE P802.15 Working Group for Wireless Personal Area Networks (WPLANs), Sep. 2008, 17 pages.
Rajagopal et al., "Use of scrambler and FEC for VLC," IEEE P802.15 Working Group for Wireless Personal Area Networks (WPANs), Oct. 2009, 11 pages.

* cited by examiner

SERIAL TRANSMISSION HAVING A LOW LEVEL EMI

BACKGROUND

Technical Field

The disclosure relates to serial communication interfaces, including conditioning techniques implemented on the signal to be transmitted at the physical layer.

Description of the Related Art

The transmission of a serial signal is subject to a number of constraints imposed by the various serial interface standards. Among these constraints, it is sought to ensure that the clock can be recovered from the signal by the receiver circuit, and that the signal has a DC component that varies little around zero (or around 50% of the signal excursion). In more recent interfaces, where rates can exceed one gigabit/s, the standards also require that the signal produces low electromagnetic interference. Electromagnetic compliance of the signal is acquired, for example, when the spectrum of the transmitted signal has no peak beyond the bounds of a template specified by the standard.

FIG. 1A illustrates conditioning operations performed at the physical layer for the USB 2.0 standard. These operations are intended to ensure clock recovery, however without guaranteeing the consistency of the DC component.

The raw serial signal D is subjected at 10 to a bit-stuffing operation. In general, bit-stuffing comprises inserting bits in the signal to create transitions where the raw signal has too few transitions to guarantee clock recovery. According to the USB 2.0 standard, this operation comprises inserting in the signal a 0-bit after any sequence of six 1-bits. The bits thus inserted are dummies in that they have no meaning—they are removed from the signal by the receiving circuit.

After the stuffing operation, the signal is subjected at 12 to an NRZI coding ("Non-Return to Zero Inverted"). This operation comprises encoding each 0-bit by a transition, and each 1-bit by a lack of transition.

FIG. 1B is a timing diagram illustrating an example of a raw serial signal D and the corresponding signals after the operations 10 and 12 (B-STUFF and NRZI).

Signal D conveys a synchronization word (seven 0-bits followed by one 1-bit), followed by an 8-bit sequence of 1-bits, then the sequence 0, 1, 0.

The stuffing operation inserts a 0-bit after the sixth 1-bit, identified by an arrow. This will ensure the presence of at least one transition for 6 consecutive 1-bits, but does not guarantee a transition in the sequence of 0-bits.

After the NRZI operation, the output signal Tx has a transition before each 0-bit, and has no transition before each 1-bit. This ensures a high number of transitions for the bit sequences of zeros.

The combination of the two operations ensures sufficient transitions in the output signal Tx for any series of consecutive bits of the same state (0 or 1) in the raw signal D.

These operations also tend to improve the consistency of the DC component of the Tx output signal, but do not guarantee a small margin of variation of the DC component.

More recent serial interface standards, aiming rates exceeding one gigabit/s, impose constraints that cannot be fulfilled by the technique of FIG. 1A, in particular relating to electromagnetic interference.

FIG. 2 illustrates conditioning operations performed at the physical layer for more recent high-speed serial transmission standards, such as HDMI, SATA, USB 3, PCI-Express (before version 3), Ethernet, FireWire, etc.

Raw serial signal D is subjected at 14 to a scrambling operation. This operation comprises mixing the incoming signal with a pseudo-random bit sequence, through a bitwise exclusive-OR operation. The pseudo-random sequence is generated by a linear feedback shift register (LFSR), hard-wired according to a specific generator polynomial, $G(x) = x^{16}+x^5+x^4+x^3+1$ in the USB 3 standard. The original signal can be recovered in the receiving circuit by subjecting the scrambled signal to the same pseudo-random sequence.

Such a scrambling operation produces statistically a signal having random characteristics, thus having a flat spectrum and generating little EMI. But the scrambling does not guarantee that the scrambled signal has sufficient transitions for recovering the clock in all cases, and does not guarantee that the scrambled signal has a DC component of low variation in all cases.

To satisfy these two last constraints, the scrambled signal is subjected at 16 to a line coding operation, the 8b/10b coding for the standards listed above. Such coding replaces every byte of the scrambled signal with a 10-bit word sought in a lookup table. The 10-bit words are constructed so that each pair of successive 10-bit words in the output signal has a transition after at most 5 bits at the same state. Furthermore, each byte of the scrambled signal has two 10-bit candidates in the table, with different numbers of 1-bits. The one or the other candidate is selected based on the number of 1-bits in the previous word, so as to tend to balance the number of 1-bits and the number of 0-bits over a small number of consecutive words in the outgoing signal. Such a coding thus ensures sufficient transitions and, especially, a DC component having a small variation.

Signal conditioning techniques of the type of FIG. 2 provide satisfactory results, but the line coding consumes a portion of the available bandwidth on the physical link (8b/10b coding requires 25% more data) and requires storing a lookup table and a relatively complex processing.

BRIEF SUMMARY

It is desired to have a serial signal conditioning technique that consumes minimal bandwidth on the physical link, while producing low electromagnetic interference and ensuring a sufficient number of transitions for clock recovery.

In an embodiment, a method for transmitting data in series comprises producing a scrambled signal by applying a scrambling using a pseudo-random sequence to an incoming serial signal conveying the data; producing an outgoing serial signal from the scrambled signal; and after each sequence of N consecutive bits at the same state in the scrambled signal, inserting a dummy bit of reverse state in the outgoing signal.

The method may comprise, to produce the output signal, the steps of counting on the fly consecutive bits at the same state in the scrambled signal; when the count reaches N, suspending the transmission of the scrambled signal, transmitting the dummy bit of reverse state, resetting the count of consecutive bits, and resuming the transmission of the scrambled signal.

The method may comprise the steps of producing a derivative signal of the incoming signal by applying to the input signal a delay corresponding to the delay introduced by the scrambling; after K+1 consecutive occurrences of a same pattern of several bits in the scrambled signal, producing the output signal from the derivative signal instead of the scrambled signal; and producing again the outgoing signal from the scrambled signal (SD) after the occurrence of a different pattern in the scrambled signal.

The derivative signal may be produced by applying to the input signal a second scrambling different from the first.

The method may comprise, for generating the output signal, the step of inserting into the output signal a tag recognizable by a receiving device, at each switching between the scrambled signal and the derivative signal.

The tag may be an invalid bit sequence having more than N consecutive bits at the same state.

The method may comprise the steps of resetting a pattern repeat counter; storing a word from the scrambled signal as a reference word; and comparing a current word from the scrambled signal to the reference word. If the words match, the repeat counter is incremented. If they do not match, the repeat counter is reset and the current word is stored as a reference word. When the content of the repeat counter reaches K, the output signal is produced from the derivative signal instead of the scrambled signal. The outgoing signal is produced again from the scrambled signal after resetting the repeat counter.

In an embodiment, a method for transmitting data in series may be provided, comprising the steps of producing a scrambled signal by applying a scrambling using a pseudo-random sequence to an incoming serial signal conveying the data; producing an outgoing serial signal from the scrambled signal; producing a derivative signal of the incoming signal by applying to the input signal a delay corresponding to the delay introduced by the scrambling; after K+1 consecutive occurrences of a same pattern of several bits in the scrambled signal, producing the output signal from the derivative signal instead of the scrambled signal; and producing again the outgoing signal from the scrambled signal after the occurrence of a different pattern in the scrambled signal.

The derived signal may be produced by applying to the input signal a second scrambling different from the first.

In an embodiment, a device for serial data transmission is provided, comprising a scrambler configured to mix a pseudo-random sequence with a serial input signal conveying the data; and an adapting circuit producing an outgoing serial signal from the output of the scrambler. The adapting circuit is configured for, after each sequence of N consecutive bits at a same state, inserting a dummy bit of reverse state in the output signal.

The device may comprise a repetition detecting circuit connected to the scrambler and configured to enable a detection signal after an observation of K+1 consecutive occurrences of a same pattern of several bits at the output of the scrambler; a processing circuit receiving the incoming signal and introducing a delay corresponding to the scrambler initialization cycle; and a switching circuit controlled by the detection circuit, connected to provide to the adapting circuit: the output of the scrambler when the detection signal is disabled, and the output of the processing circuit when the detection signal is enabled.

The processing circuit may be a second scrambler designed to operate a different scrambling than the first scrambler.

In an embodiment, a device for serial data transmission may be provided, comprising a scrambler configured to mix a pseudo-random sequence with a serial input signal conveying the data; an adapting circuit producing an outgoing serial signal from the output of the scrambler; a repetition detecting circuit connected to the scrambler and configured to enable a detection signal after an observation of K+1 consecutive occurrences of a same pattern of several bits at the output of the scrambler; a processing circuit receiving the incoming signal and introducing a delay corresponding to the scrambler initialization cycle; and a switching circuit controlled by the detection circuit, connected to provide to the adapting circuit: the output of the scrambler when the detection signal is disabled, and the output of the processing circuit when the detection signal is enabled.

BRIEF DESCRIPTION OF THE SEVERAL VIEWS OF THE DRAWINGS

The following description of particular embodiments is provided for exemplary purposes only and represented in the appended drawings, in which.

DETAILED DESCRIPTION

In recent serial interface standards, it has been recommended to use line coding, including the 8b/10b coding, in particular for consistency of the DC component of the transmitted signal. This is probably due to the fact that, at the time these standards were established, it was difficult to design simple analog circuits capable of properly handling a serial signal having a large variation of its DC component.

Meanwhile, receiver analog circuits have improved, and the constraint that the transmitted signal should have a substantially constant DC component may be substantially relaxed. Analog circuits can now operate properly with a DC level varying, for example, between 20% and 80% of the signal excursion.

Figure 3:
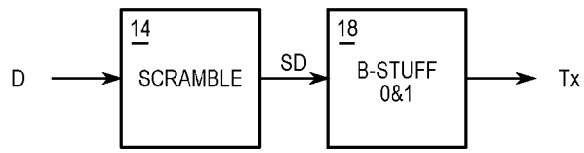
FIG. 3 shows operations implemented in a serial signal conditioning process that facilitates optimizing available bandwidth on a physical link according to an embodiment.

FIG. 3 illustrates a process flow taking into account these considerations, to facilitate optimizing the bandwidth use of the physical link while being simple to implement, and to facilitate ensuring sufficient transitions in the output signal for clock recovery.

Figure 1A:
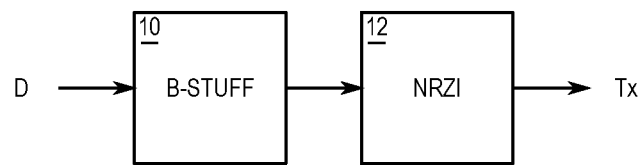
FIGS. 1A and 1B, previously described, illustrate operations implemented in a conventional serial signal conditioning process and an example of signals produced in the process.
Figure 1B:
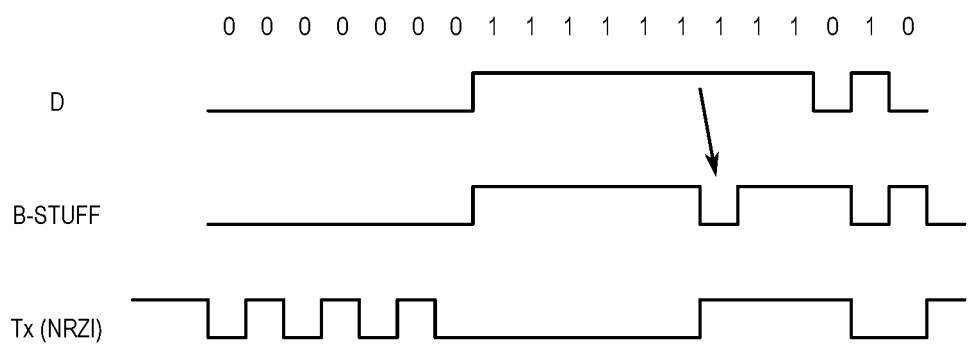
Figure 2:
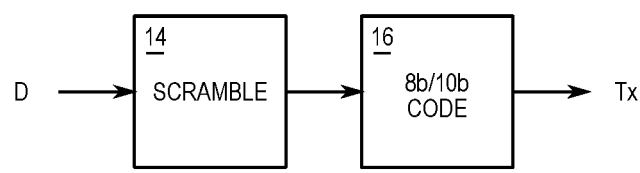
FIG. 2, previously described, illustrates operations implemented in another conventional serial signal conditioning process.

The raw serial signal D is subjected to a scrambling operation 14, which may be similar to that of FIG. 2. The scrambled signal SD is submitted to a bit-stuffing operation at 18. The stuffing operation 18 is different from that performed in the flow of FIG. 1A (USB 2) in that it operates on sequences of consecutive 1-bits, but also on sequences of consecutive 0-bits. Thus, a dummy 0-bit is inserted in the output signal Tx after each series of N consecutive 1-bits in the scrambled signal SD, and a dummy 1-bit is inserted after each series of N consecutive 0-bits.

The scrambling operation 14 facilitates reducing electromagnetic interference, and the stuffing operation 18 facilitates the presence of at least one transition in the signal every N+1 consecutive bits. For example, N=5.

The stuffing function 18 is particularly simple to implement. The consecutive bits at the same state may be counted on the fly in the scrambled signal SD. As soon as the count reaches N, the transmission of the scrambled signal is suspended during one cycle for transmitting the dummy bit of reverse state. The consecutive bit count is then reset, and transmission of the scrambled signal is resumed.

The bandwidth consumed by the stuffing operation depends on the number of dummy bits inserted in the output signal Tx per unit time. This number depends on the nature of the scrambled signal SD. The purpose of scrambling being to confer random characteristics to signal SD, this signal statistically has many transitions, reducing the probability for the need of stuffing bits.

Simulations conducted by the inventors using random sequences for the raw signal D indicate that the stuffing operation uses 16% of additional data for N=3, 3.4% for N=5, and 1.7% for N=6.

In the case of FIG. 1A, where the stuffing operation is performed directly on the raw signal D, a lower efficiency is obtained, because the raw signal D may in many circumstances be regular in nature, for example during the transmission of pixels of a uniform area of an image, requiring the insertion of a dummy bit every N transmitted bits.

The simulations also show that the DC level of the output signal varies within the limits of 20% and 80% of the signal swing, which is an acceptable variation range in current analog receiver circuits.

In exceptional circumstances, the raw serial signal D may be such that the scrambled signal exhibits repetitive patterns. The number of repetitions may be such that the spectrum of the scrambled signal temporarily exhibits a peak exceeding a desired limit. The stuffing operation does not improve the situation, while a line coding of the type 8b/10b in the process flow of FIG. 2, could improve it. Indeed, the 8b/10b coding may substitute a same sequence by two different codes, depending on the balance to be achieved between 1-bits and 0-bits. However, the 8b/10b coding does not guarantee the total absence of repetitive patterns.

Figure 4:
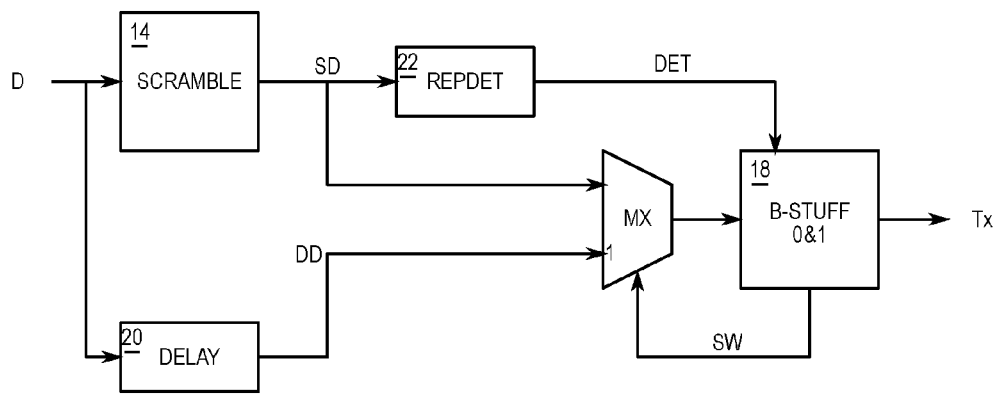
FIG. 4 is a block-diagram of an embodiment of a conditioning circuit cancelling repetitive patterns in the transmitted signal.

FIG. 4 is a block diagram of an embodiment of a conditioning circuit for removing repeating patterns in the output signal Tx. The raw serial signal D is provided simultaneously to a scrambling circuit 14 and a delay circuit 20. The circuit 20 introduces a delay equal to the number of initialization cycles required by the LFSR of the scrambling circuit 14. Thus, the derivative signal DD produced by circuit 20 corresponds to the signal D put in phase with its scrambled version SD. A multiplexer MX is configured to send either one of the signals SD and DD to the input of a circuit 18 implementing the bit stuffing operation. The choice of the signal SD or DD is determined by a signal SW produced by the circuit 18.

In an embodiment, the inactive value of signal SW selects the scrambled signal SD, in which case the circuit is configured to operate according to FIG. 3. The active value of signal SW selects the delayed signal DD, in which case the circuit 18 operates on the raw serial signal put in phase with the scrambled signal.

A repetition detecting circuit 22 is configured to observe the scrambled signal SD and enable a signal DET for the circuit 18 when the scrambled signal contains a pattern repeated at least K times. The circuit 18 produces the signal SW based on the signal DET. According to a first alternative, the signal SW may be identical to signal DET. According to an alternative, the signal SW is enabled simultaneously with the signal DET, but disabled later than the signal DET, so that the duration of the transmission phase of the derivative signal DD is greater than a threshold.

The fact that the original signal D mixed with a pseudo-random sequence produces a signal having regular characteristics means that the original signal is to a certain extent correlated to the pseudo-random sequence, and thus has characteristics similar to those of the pseudo-random sequence. The fact of then transmitting the original signal instead of the scrambled signal is a better choice to reduce the electromagnetic interference.

Alternatively, a different scrambling than the one applied in 14 could be applied in 20.

The circuit 18 may be designed to insert in the outgoing signal Tx a tag for each transition of the switching signal SW. This tag is recognizable by the receiving circuit (not shown) to apply to the received signal an adequate treatment (scrambling or not after removing the dummy bits inserted by the stuffing operation). This tag may be a sequence that should not appear in the signal Tx in normal operation, an invalid sequence, such a sequence comprising more than N consecutive bits at the same state (1 or 0).

A repetition may be sought by the circuit 22 over consecutive words of same size in the signal SD. At each arrival of a word, the detection circuit 22 stores it as a reference word, for example in a dedicated register. Each new word is compared to the stored reference word. If the words match, a repetition counter is incremented. If the words don't match, the new word replaces the reference word and the repetition count is reset. The signal DET is enabled as soon as the repetition count reaches a threshold K, and it remains enabled as long as the repetition counter is not reset.

The size of the reference word may be chosen according to the maximum size of the repeating patterns to be detected, therefore the minimum frequency component to control of the signal spectrum. If the word is one byte, for example, repetitions of patterns of 8, 4, 2 and 1 bits may be detected. In contrast, two occurrences of a sub-pattern of 4 bits, four occurrences of a sub-pattern of 2 bits, or eight occurrences of a sub-pattern of 1 bit will not be counted as repetitions with this embodiment—each of these sub-patterns should be repeated at least four, eight and sixteen times, respectively. Repetitions of patterns larger than 8 bits will not be detected.

According to a more elaborate embodiment, multiple reference words of different sizes may be used, for example 8, 7, 6, 5, 4 and 3 bits, with a single repetition counter. The operations described above are carried out for each reference word. Then, when a pattern of any size between 3 and 8 bits is repeated K times, the detection circuit enables signal DET.

Alternatively, a counter and a threshold may be dedicated to each reference pattern. Then, the first counter that reaches its threshold enables the signal DET.

Figure 5:
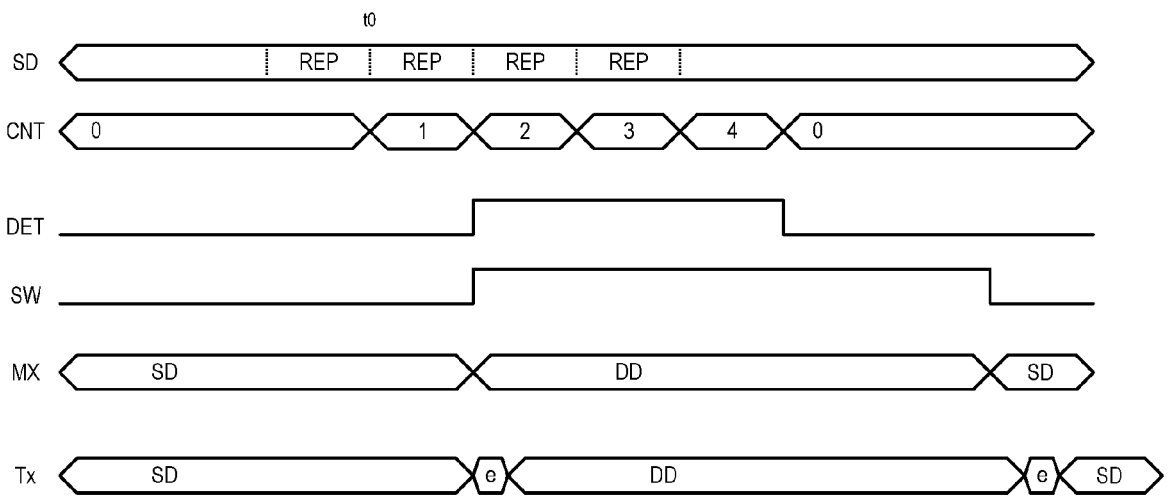
FIG. 5 is an exemplary timing diagram illustrating the operation of the circuit of FIG. 4.

FIG. 5 is an exemplary timing diagram for understanding the operation of the circuit of FIG. 4, in the context of the use of a single reference pattern. It shows an example of evolution of signals SD, DET, SW and Tx, and of the output signal of the multiplexer MX. It also shows the evolution of the repetition counter CNT of detection circuit 22.

Initially, the signals DET and SW are disabled and the counter CNT is 0. The multiplexer MX transmits the scrambled signal SD to the stuffing circuit 18.

At a time t0, the signal SD has transmitted a first repeated pattern REP. The content of counter CNT is incremented to 1. Then, the pattern is repeated three more times. The counter is incremented at the end of each pattern, and reaches the count of 4 after the fourth repetition.

The threshold K is here set to 2 repetitions, corresponding to K+1=3 consecutive occurrences of the same pattern. Thus, once the counter reaches the count of 2, the signal DET is enabled. The signal SW is also enabled, so that the multiplexer MX transmits the derivative signal DD to the stuffing circuit 18. The circuit 18 inserts a tag e in the output signal Tx before processing and transmitting the signal DD. As mentioned above, the tag e is used to signal to the receiving circuit that processing mode should be switched (here by switching from scrambling to no scrambling). This tag may be an invalid sequence, containing, for example, more than N consecutive bits at 1 or 0.

After the counter reaches 4, no repetition is detected. The signal DET is disabled, and the counter is reset. The signal SW remains enabled preferably until the number of bits transmitted in the signal DD reaches a threshold. This threshold may be chosen large compared to the number of bits of tags e, for example ten times larger. This ensures that the insertion of tags e has a negligible impact on the bandwidth use. When the signal SW is disabled, the multiplexer MX transmits again the signal SD to the circuit 18. After processing the sequence of signal DD, the circuit 18 inserts a new tag e in the signal Tx, indicating to the receiving circuit to switch back to scrambling mode.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating an output signal based on a serial data signal, the generating including scrambling, using a pseudo-random sequence, the serial data signal, producing a scrambled signal;
detecting occurrences of a data pattern in the scrambled signal; and
responding to the detection of one or more occurrences of the data pattern in the scrambled signal by taking one or more actions to condition data encoded in the output signal.

2. The method of claim 1, comprising:
initiating transmission of the scrambled signal as the output signal;
counting consecutive bits at a same state in the output signal; and
when the count of consecutive bits reaches a threshold number,
suspending transmission of the scrambled signal as the output signal;
transmitting a dummy bit of a reverse state;
resetting the count of consecutive bits; and
resuming transmission of the scrambled signal as the output signal.

3. The method of claim 1, comprising:
generating a derivative signal based on the serial data signal, the derivative signal having a delay corresponding to a delay introduced by the scrambling of the serial data signal;
generating the output signal based on the scrambled signal;
after a threshold number K+1 of consecutive occurrences of a same pattern of several bits in the scrambled signal, generating the output signal based on the derivative signal instead of the scrambled signal; and after an occurrence of a different pattern in the scrambled signal, resuming generating the output signal based on the scrambled signal.

4. The method of claim 3 wherein generating the derivative signal comprises scrambling the serial data signal using a different pseudo-random sequence.

5. The method according to claim 3, comprising:
inserting into the output signal a tag recognizable by a receiving device, at each switching between the scrambled signal and the derivative signal.

6. The method of claim 5 wherein the tag is an invalid bit sequence having a length of more than a threshold number of consecutive bits.

7. The method of claim 3, comprising:
storing a word from the scrambled signal as a reference word;
comparing a current word from the scrambled signal to the reference word;
when the reference and current words match, incrementing a pattern-repeat counter;
when the stored and current words do not match, resetting the pattern-repeat counter and storing the current word as the reference word;
when the content of the repeat counter is equal to or greater than K, generating the output signal based on the derivative signal instead of the scrambled signal; and
when the pattern-reset counter is reset, resuming generation of the output signal based on the scrambled signal.

8. The method of claim 1, comprising:
generating an alternative serial data signal based on the serial data signal, the alternative serial data signal having a delay corresponding to a delay introduced by the scrambling of the serial data signal;
monitoring a number of consecutive occurrences of a data pattern of several bits in the scrambled serial data signal;
selecting one of the scrambled serial data signal and the alternative serial data signal based on the monitoring; and
generating the output signal using the selected one of the scrambled serial data signal and the alternative serial data signal.

9. The method of claim 8 wherein the monitoring comprises comparing the number of consecutive occurrences of the data pattern to a threshold number.

10. The method of claim 9, comprising:
tracking the number of consecutive occurrences using a pattern-repeat counter;
when the number of consecutive occurrences is less than or equal to the threshold number, selecting the scrambled serial data signal to generate the output signal;
when the number of consecutive occurrences is greater than the threshold number, selecting the alternative serial data signal to generate the output signal; and
when a different data pattern is detected in the scrambled serial data signal, resetting the pattern-repeat counter.

11. The method of claim 8 wherein generating the alternative serial data signal comprises scrambling the input serial data signal using a different pseudo-random sequence.

12. The method of claim 8, comprising:
storing a previous word of the scrambled serial data signal as a reference word;
comparing a current word of the scrambled serial data signal to the reference word;

when the reference word and the current word match, incrementing a pattern-repeat counter;

when the reference word and the current word do not match, resetting the pattern-repeat counter and storing the current word as the reference word;

when a value of the pattern-repeat counter exceeds a threshold, producing the output signal using the alternative serial data signal; and when the value of the pattern-repeat counter does not exceed the threshold, producing the outgoing signal from the scrambled serial data signal.

13. A device, comprising:

an input, which, in operation, receives a serial data signal;

signal conditioning circuitry, which, in operation:

generates an output signal based on the serial data signal, the generating including scrambling, using a pseudo-random sequence, the serial data signal, producing a scrambled signal;

detects occurrences of one or more data patterns in the scrambled signal; and responds to a detection of one or more occurrences by taking one or more actions to condition the output signal.

14. The device of claim 13 wherein the signal conditioning circuitry, in operation:

initiates transmission of the scrambled signal as the output signal;

counts consecutive bits at a same state in the output signal; and when the count of consecutive bits reaches a threshold number, suspends transmission of the scrambled signal as the output signal;

transmits a dummy bit of a reverse state;

resets the count of consecutive bits; and resumes transmission of the scrambled signal as the output signal.

15. The device of claim 13 wherein the signal conditioning circuitry, in operation:

generates an alternative serial data signal based on the serial data signal, the alternative serial data signal having a delay corresponding to a delay introduced by the scrambling of the serial data signal;

monitors a number of consecutive occurrences of a data pattern of several bits in the scrambled serial data signal;

selecting one of the scrambled serial data signal and the alternative serial data signal based on the monitoring; and generating the output signal using the selected one of the scrambled serial data signal and the alternative serial data signal.

16. The device of claim 15 wherein the signal conditioning circuitry, in operation:

inserts into the output signal a tag recognizable by a receiving device, at each switching between generation of the output signal based on the scrambled signal and generation of the output signal based on the derivative signal.

17. The device of claim 15 wherein the monitoring comprises comparing the number of consecutive occurrences of the data pattern to a threshold number.

18. The device of claim 15 wherein generating the alternative serial data signal comprises scrambling the input serial data signal using a different pseudo-random sequence.

19. The device of claim 15 wherein the signal conditioning circuitry, in operation:

stores a previous word of the scrambled serial data signal as a reference word;

compares a current word of the scrambled serial data signal to the reference word;

when the reference word and the current word match, increments a pattern-repeat counter;

when the reference word and the current word do not match, resets the pattern-repeat counter and stores the current word as the reference word;

when a value of the pattern-repeat counter exceeds a threshold, produces the output signal using the alternative serial data signal; and when the value of the pattern-repeat counter does not exceed the threshold, produces the outgoing signal from the scrambled serial data signal.

20. The device of claim 15 wherein the signal conditioning circuitry comprises:

first scrambling circuitry, which, in operation, scrambles the serial data signal;

second scrambling circuitry, which, in operation, scrambles the serial data signal; and a multiplexer, which, in operation, couples an output of the signal conditioning circuitry to a selected one of the first scrambling circuitry and the second scrambling circuitry.

21. A system comprising:

one or more signal processing devices; and a serial data interface coupled to the one or more signal processing devices, wherein the serial data interface, in operation:

generates an output signal based on a serial data signal, the generating including scrambling, using a pseudo-random sequence, the serial data signal, producing a scrambled signal;

detects occurrences of one or more data patterns in the scrambled signal; and responds to a detection of one or more occurrences by taking one or more actions to condition the output signal.

22. The system of claim 21 wherein:

the detecting comprises counting consecutive bits at a same state in the output signal and determining when the count of consecutive bits reaches a threshold number; and the responding comprises:

inserting a dummy bit of a reverse state in the output signal; and resetting the count of consecutive bits.

23. The system of claim 21 wherein the serial data interface, in operation:

generates an alternative serial data signal based on the serial data signal, the alternative serial data signal having a delay corresponding to a delay introduced by the scrambling of the serial data signal;

monitors a number of consecutive occurrences of a data pattern of several bits in the scrambled serial data signal;

selecting one of the scrambled serial data signal and the alternative serial data signal based on the monitoring; and generating the output signal using the selected one of the scrambled serial data signal and the alternative serial data signal.

24. The system of claim 23 wherein generating the alternative serial data signal comprises scrambling the input serial data signal using a different pseudo-random sequence.

* * * * *